H. Howr,
Sharpening Reciprocating Saws.
N° 20,945.  Patented July 20, 1858.
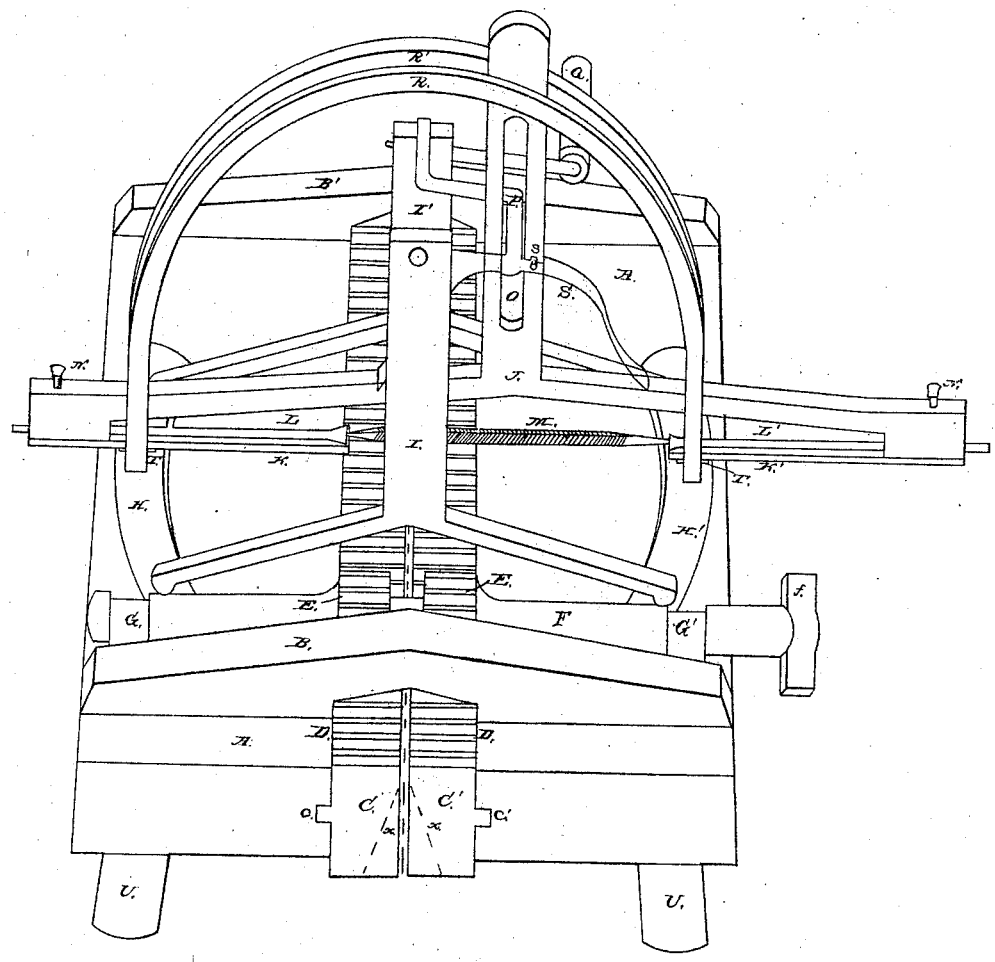

UNITED STATES PATENT OFFICE.

H. HOW, OF GEORGETOWN, MASSACHUSETTS.

SAW-FILING MACHINE.

Specification of Letters Patent No. 20,945, dated July 20, 1858.

*To all whom it may concern:*

Be it known that I, HEMAN How, of Georgetown, in the county of Essex and Commonwealth of Massachusetts, have invented a new and useful Saw-Filing Machine; and I do hereby declare that the following is a full, clear, and exact description of the construction and operation of the same, reference being had to the accompanying drawings, forming a part of this specification.

A A is an iron or wooden table made in two parts, held together by the bars, B B', and standing on four legs U.

C C' are two slides, of iron or wood, for holding and moving the saw to be filed,—the saw, 1, 2, being placed between them and confined by means of screws uniting C C'.

c c' are cleats, or projections, fitting in corresponding grooves in C C'.

D D' are racks fastened to the top of C C', or cast in one piece with them.

E E are pinions on the shaft F, which turn in boxes in the uprights, G G'; the object of said pinions being to move the racks, D D', by means of the handle, f.

By reference to the drawing, it will be seen that the bars, B B', and the shaft, F, are so shaped as to allow the rack and saw to pass under them without touching.

H H' are parts of a flat metallic ring resting on the table, A A.

I I' are stationary metallic uprights, shaped as seen in the drawing, their lower extremities being fastened to H H' in any convenient manner; their upper extremities being furnished with holes in which the crank-shaft, P, revolves.

R and R' are curved uprights, far enough apart to allow the frame, J, to move between them, and fastened at their lower ends to the pieces H H'.

J is a moving metallic frame for holding and carrying the file and shaped as seen in the figure.

O is a slot in the upright part of J, for the admission of the crank-shaft P, which plays therein.

K K' are flat pieces of steel, or other suitable material, riveted to J; the under sides being smooth so as to pass with little friction on the rubber or leather cushion, T T.

L L' are round metallic springs, passing through holes in J, and held in any desirable position by means of the set screws N N'; the two inner ends of said springs being enlarged as seen in the drawing, and furnished with conical holes so as to receive the two ends of the file, M. The springs, L L', being sufficiently stiff and at the same time elastic, carry the file over the saw almost exactly as it is carried by the hand of a person.

S is a flat spring the upper part of which is slotted so as to slip over the upright J, the extremities of said spring bearing on the horizontal arms of J.

s is a pin to prevent the spring, S, from rising too high. The design of spring, S, is to furnish an elastic cushion for the crank shaft, P, to strike upon, and also to operate in conjunction with the springs L L', and for the objects specified above.

Under H H' is a curved slot through the table; and projecting downward from the under sides of H H', through said slots are screw bolts with nuts, so that H and H' and all the parts connected with them, may be so turned as to cause the file M, to cross the saw at any desirable angle. It is also obvious that the saw may be held between C and C' at any requisite angle by splitting the pieces, C, C', as represented by the dotted lines, x, x, or in any other equivalent manner.

Operation: The operator first draws the slides, C, C', entirely out of the table, A A, and fastens in the saw between them by means of the screws alluded to above; he then replaces the slides so that the first tooth of the saw shall be under the file. Having done this, he turns the crank shaft, P, by means of the handle Q, which will obviously cause the file to reciprocate over the saw, bearing down as it files, and rising up as it passes back. When one cut is finished, the operator, by means of the handle, f, moves the saw along the width of a tooth; and so on till all are filed.

What I claim as my invention and desire to secure by Letters Patent, is:

The crank-shaft, P, operating as set forth, in combination with the slotted upright, or moving frame, J, the flat spring, S, and the round metallic springs, L L', substantially as described and for the objects specified.

HEMAN HOW.

Witnesses:
N. AMES,
O. C. SLEEPER.